Oct. 10, 1933.   O. U. ZERK   1,929,765
LUBRICATING APPARATUS
Filed Feb. 24, 1930   2 Sheets-Sheet 1
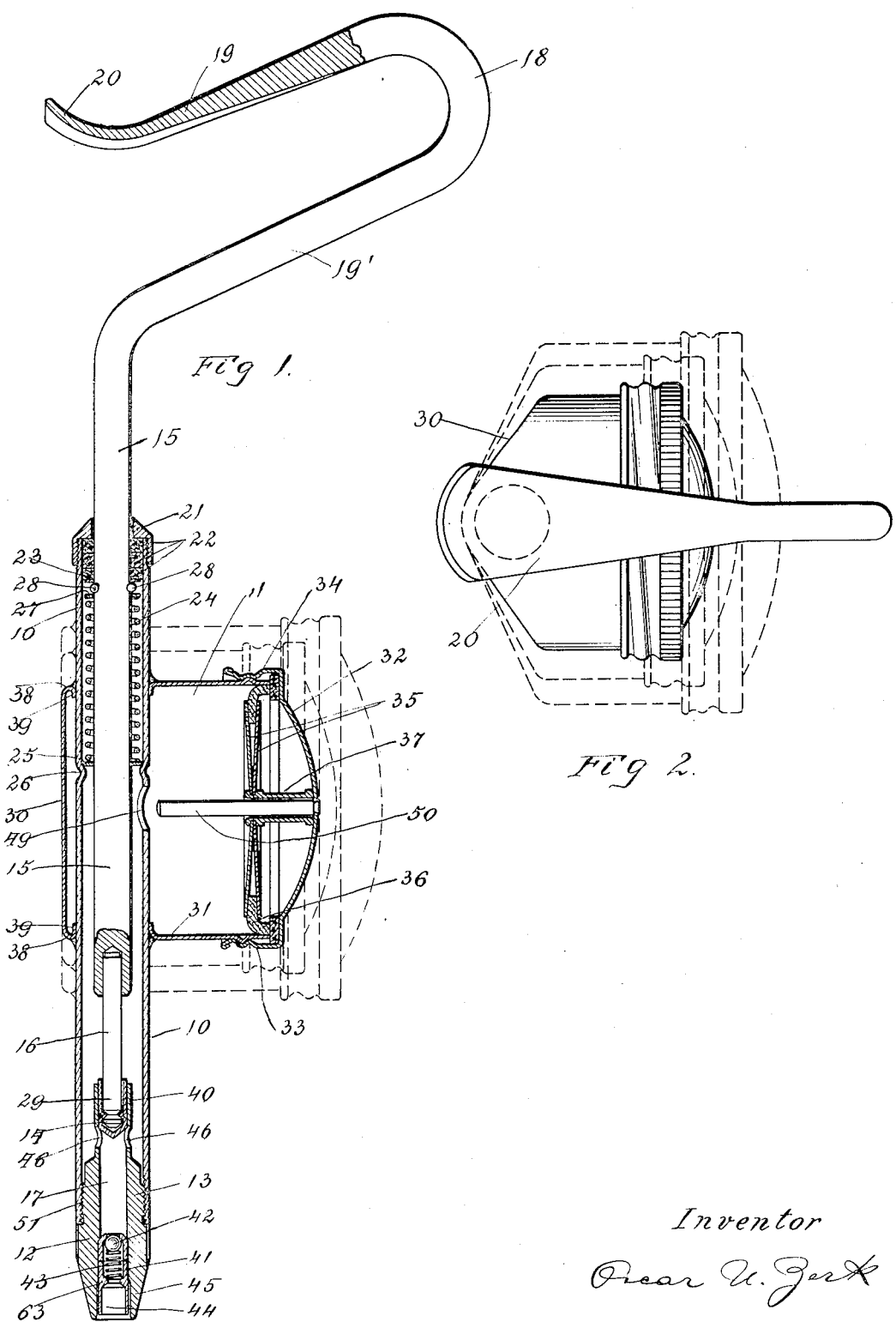
Inventor
Oscar U. Zerk

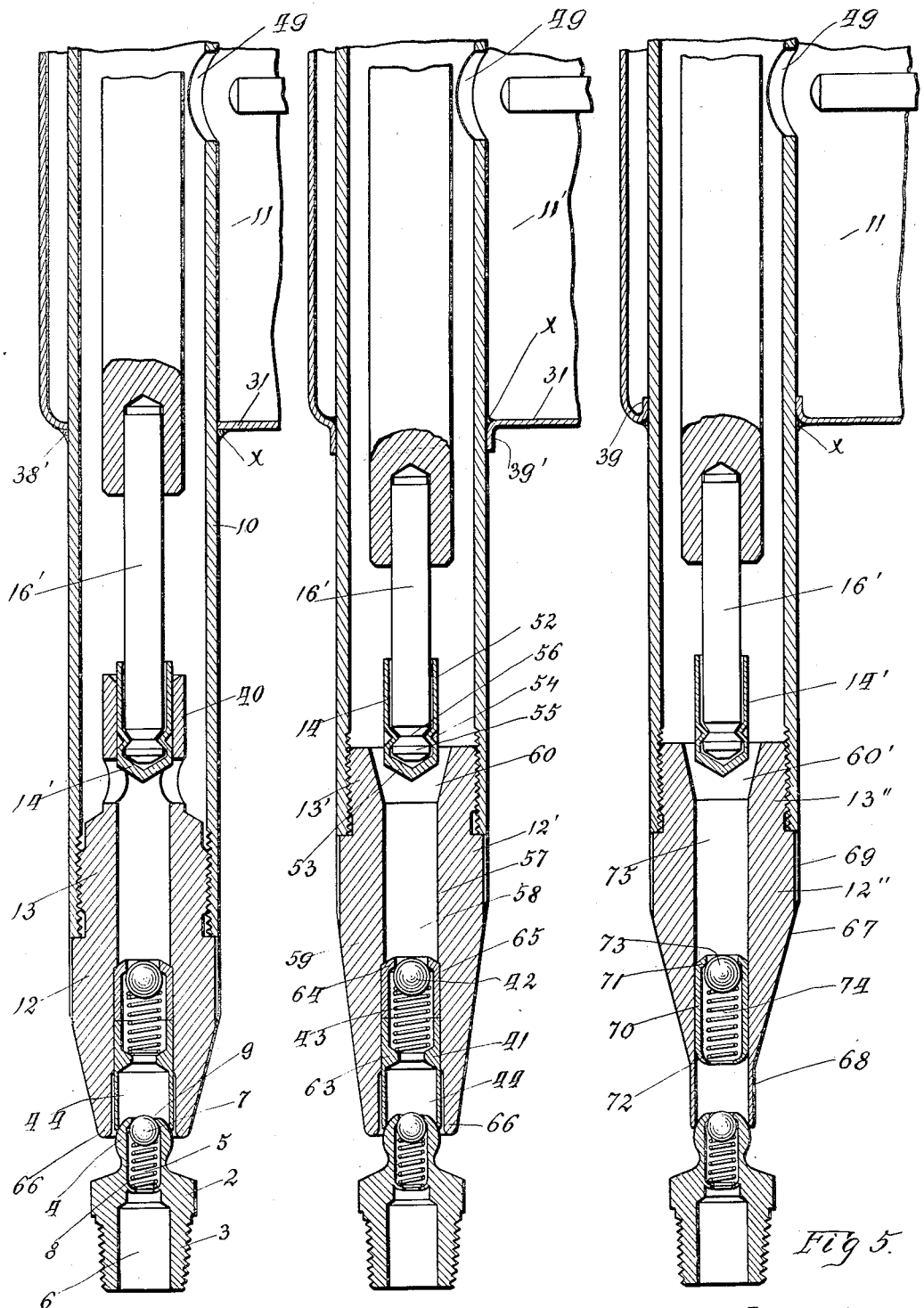

Patented Oct. 10, 1933

1,929,765

UNITED STATES PATENT OFFICE 1,929,765

LUBRICATING APPARATUS

Oscar U. Zerk, Chicago, Ill., assignor to Alemite Corporation, Chicago, Ill., a corporation of Delaware Application February 24, 1930. Serial No. 430,720

10 Claims. (Cl. 221—47.4)

This invention relates to lubricating means and methods, and particularly to means and methods in which a lubricant gun is employed.

In lubrication by means of lubricant guns, two general types of apparatus are commonly employed. First, there is the interlocking type employing a coupling by means of which a nozzle on the gun may be temporarily locked during the lubricating period, to a lubricant receiving nipple on the bearing, machine, or the like to be lubricated; and second, there is the contact type whereby the lubricating gun nozzle and the lubricant receiving nipple are temporarily maintained in lubricant communicating contact by pressure between the nozzle and the nipple manually applied.

While my invention, broadly considered, is adaptable for use in connection with either of the above named types of apparatus, I have chosen to illustrate and describe herein the adaptation of my invention to the contact type.

My present invention is applicable to the type of apparatus illustrated in my co-pending applications Serial No. 396,354, filed September 30, 1929, which issued February 25, 1930, as Patent No. 1,748,818, Serial No. 401,276, filed October 21, 1929, which issued February 25, 1930, as Patent No. 1,748,817, Serial No. 410,216 filed November 27, 1929, which issued March 4, 1930, as Patent No. 1,749,727, Serial No. 416,824, filed December 27, 1929, and Serial No. 416,825 filed December 27, 1929.

In prior lubricating constructions involving a discharge nozzle there commonly are two serious disadvantages. The first is that there is liability of leakage between the nozzle and the tubular support therefor, to which it is commonly secured, through the threads by which the nozzle is secured to the cylinder, during the lubricating period when the lubricant in the support is under pressure. The second disadvantage is that the pump piston tends to jam or stick in the cylinder due to the application of manual pressure to the piston eccentrically of the piston. This eccentric application of pressure is particularly troublesome when the piston is connected directly to a piston rod and the rod is provided with a handle for the application of thrust efforts to the piston.

It is very important that the piston shall have the minimum of play or clearance in the piston cylinder. This play or clearance should, preferably, be made not more than .001 of an inch. The piston rod in guns of this type is usually formed from round soft steel rod or wire by bending it in an automatic wire working machine to form the handle portion thereon and such material is not accurately round nor accurate in diameter.

It has been found impracticable to machine the end of the piston rod to form the piston integrally therewith, because although a piston of correct and accurate size might thus be made, it would be impracticable in manufacture to maintain such a piston in axial alignment with the piston rod guide at the end of the gun opposite the cylinder. Due to the small allowable clearance referred to, the slightest variation from axial alignment of the piston and guide will cause the piston to stick or bind in the cylinder. Because of these difficulties, it has, therefore, become the common practice to make the piston separate from the piston rod and to connect them with a joint permitting oscillatory movement therebetween.

With such constructions, so long as the pressure applied by the handle to the piston rod is applied substantially axially or concentric with the piston rod and piston and with a negligible amount of side thrust on the piston, no serious difficulties are encountered; but, when the pistol grip type of handle is employed on the piston rod, the pressure on the rod is not co-axial therewith and the overhanging or off-set portion of the handle on the piston rod exerts a great lateral pressure against the connection between the piston and rod which causes the piston to bind or stick in the cylinder.

In some prior constructions, to obviate this difficulty the pistol grip has been made extremely short, but this introduces another difficulty, namely, that it causes the pressure of the hand on the grip to come in the sensitive palm portion of the hand and causes pain to the operator when applying pressure on the handle, a condition which is not true of the longer pistol grip handle on which the pressure comes on the less sensitive ball portion of the hand.

It is, therefore, an object of my invention to provide in a lubricant gun an improved connection between the pump piston and the piston rod which will not cause the piston to bind or jam in the cylinder irrespective of the eccentricity of application of pressure to the piston and/or the eccentricity and lateral thrust on the piston when pressure is applied by a pistol grip type of handle on the piston rod.

Another object of my invention is to provide an improved piston and piston rod construction for lubricant guns in which the piston may be oscillatably connected to the rod adjacent the end of the piston and the rod may have pressure applying engagement with the piston between the ends of the piston.

Another object of my invention is to provide an improved simple connection between the pump piston and the piston rod which is non-binding or non-jamming, irrespective of how much eccentric pressure is exerted or at what eccentricity, the pressure of a pistol grip shaped grease gun handle may be applied.

Another object of my invention is to provide an improved pump piston of such length that it will be guided in the pump cylinder by the greater portion of its outer longitudinal surface, at the beginning of its forward stroke.

Another object of my invention is to provide an improved piston construction for a lubricating apparatus, wherein the point of lateral contact between the piston rod end and the universally connected pump piston is disposed within a hollow portion of the pump piston.

Another object of my invention is to provide an improved piston means for lubricators, wherein the point of lateral pressure between the piston rod end and the hollow pump piston is disposed at a point placed beyond the outer end of the pump piston.

Another object of my invention is to provide in lubricant guns an improved piston construction wherein the point of contact of the lateral pressure between the hollow pump piston and the piston rod end is always exerted at a point inside of the piston cylinder guide.

Another object of my invention is to provide in apparatus of the type described, improved piston means wherein the point of contact whereat the lateral pressure between the hollow pump piston end and the piston rod is exerted is disposed at a point between the two ends of the contacting portion of the piston.

Another object of my invention is to provide an improved dispensing element for a lubricating system providing an oscillatable discharge nozzle of improved form, adapted to make sealing engagement at the base of the nipple tip.

Another object of my invention is to provide an improved lubricant dispensing mechanism of the above type wherein disengagement of the oscillatable nozzle and the cooperant nipple will not readily be had even though the lubricating mechanism supporting the nozzle may be angularly deflected to a considerable degree relative to the axis of the nipple.

Another object of my invention is to provide in a lubricant dispensing mechanism of the above type improved means whereby a positive stop is effected to prevent an undue departure from longitudinal alignment of the oscillatable nozzle from the lubricant receiving nipple tip.

Another object is to provide an improved piston and piston rod construction in which the rod may engage the piston internally of the piston in a hollow portion thereof.

Another object is to provide an improved piston and piston rod construction in which the pressure from the piston rod may be applied to the piston adjacent that end of the piston opposite the piston rod connected thereto.

Another object is to provide an improved piston and piston rod construction in which the axial and/or lateral pressure communicated to the piston from the piston rod may be applied to the piston on the portions thereof at or beyond the medial zone of the piston axially considered in the direction away from the piston rod.

Another object is to provide an improved piston and piston rod construction in which the axial and/or lateral pressure communicated to the piston from the piston rod may be applied to the piston on the portions thereof at or beyond the medial zone of the piston axially considered in the direction away from the piston rod and internally of the piston with respect to its cylindrical surface.

Another object is to provide in a lubricant gun, an improved cylinder piston and piston rod construction in which the axial and/or lateral pressure communicated to the piston from the rod may be applied to the piston always at a point axially internal with respect to the end of the cylinder wall.

Another object of my invention is to provide in a lubricant gun, an improved integral pump compression cylinder and lubricant nipple engageable nozzle.

Another object is to provide an improved integral nozzle and pump cylinder construction which may be easily and quickly interchanged with the other parts of the lubricant gun.

Another object of my invention is to provide a lubricant gun which may be readily supplied with lubricant containing reservoirs of varying sizes without changing the construction of the other operative parts of the gun.

Another object of my invention is to provide a lubricant coupler having inter-engaging outer and inner nozzle and nipple elements so formed and related as to effect an extreme wedging angle of contact with the outer nozzle element of thin resilient spring metallic material, whereby when the nozzle and nipple are longitudinally pressed together, the lateral thrust effort communicated to the inner surfaces of the tubular nozzle will be greatly multiplied to so much the form of the engaged portion of the tubular nozzle as to make it fit the form of the nipple, even though the nozzle and nipple are disposed in different angular relations.

Another object of my invention is to provide improved lubricating coupling involving separable nozzle and nipple elements wherein pressure engagement is had between the elements to effect lubricant seal at substantially an extreme wedging angle of the engaged portions of said elements, whereby a good lubricant seal is effected between the elements with a minimum of effort.

Another object of my invention is to provide in a lubricant coupling, such as that achieving any of the foregoing objects, whereby the extreme wedging angle of contact between the elements prevents so scraping the soft material of the nipple contact surface by the nozzle element that the nipple surface will not be injured by the nozzle.

Another object of my invention is to provide a tubular nozzle and a nipple of the contact type adapted to be associated therewith with the contacting portions of both of said elements so rounded as to engage at an extreme wedging angle and whereby operative engagement between the nozzle and nipple surfaces does not injure the nipple surface, but on the contrary at each operation tends to repair injuries of said surface.

Other objects of my invention and the invention itself will become apparent by reference to the following description taken in connection with the accompanying drawings, in which:—

Fig. 1 illustrates in longitudinal medial sectional view an embodiment of my invention;

Fig. 2 is an end elevational view of the apparatus of Fig. 1. In Figs. 1 and 2, by dotted lines, lubricant reservoirs of other sizes than that illustrated, are indicated as being applicable to the other parts of the mechanism;

Fig. 3 shows a longitudinal medial sectional view of a lubricant ejecting mechanism applicable to the associated apparatus of Fig. 1 in enlarged view associated with a lubricant receiving nipple to which it is cooperatively related;

Fig. 4 is a view similar to that of Fig. 3 of another embodiment of my invention;

Fig. 5 is a like view of still another embodiment:

The apparatus of Figs. 1 to 3 inclusive will be first referred to wherein my invention is illustrated in a certain embodiment in Figs. 1 and 2, and with certain modifications in Fig. 3. A lubricant gun is illustrated therein capable of supplying lubricant to a lubricant receiving nipple under high pressure in order to supply lubricant to bearings of a mechanism served by the nipple or others substantially like it.

In Fig. 3, the nipple is shown as comprising a preferably hexagonal body 2 having an exteriorly threaded stem 3 for a fixation within a recess of an element to be lubricated and a lubricant receiving tip 4 of preferably parti-spherical form. The tip 4 is generally knob-shaped and is provided with a longitudinal passage 5 in communication with the passage 6 of the stem. A valve 7 and valve 8 are disposed within the passage 5, the valve closing the lubricant receiving opening 9 at the end of the nipple tip.

The lubricant gun is provided with a long slender tubular barrel 10 supporting an intermediately disposed lubricant supply reservoir 11, and a combination pressure cylinder and nozzle supporting element 12 screwthreaded by its shank 13 within an interiorly threaded end of the tube. A piston 14 and piston rod 15 is provided with an intermediate connecting rod 16 whereby the piston may be reciprocated within the tubular bore 17 of the element 12. Posteriorly, the piston rod 15 is provided with a U-shaped handle portion 18 by bending it laterally from the straight portion 15 in a generally obtuse angular direction. The free end 19 of the handle 18 is rolled or swedged to provide a greatly widened manually engageable thrust surface 20 which is convexly rounded transversely of the arm 19, which has a recedent tip 20, also preferably convexly rounded in the transverse direction.

The barrel 10 is provided with a centrally perforated cap 21 at its posterior end, screwthreaded onto the tubular barrel and a set of packing washers 22 are firmly compressed in place against the inner end surface of the cap 21 and a retaining washer 23. A helical retractile spring 24 surrounds the rod 15 and engages by its forward end with a washer 25 and by its posterior end with a washer 27. The washer 25 is pressed by the spring against the inwardly converging portion 26 of the walls of the tube 10, by inwardly crimping the lateral walls of the tube at the point 26. The washer 27 is seated against lateral projections 28 of the rod 15, whereby except during use of the gun, when manual pressure is applied against the handle 18, the piston rod and piston are caused by the spring 24 to take the retracted position, shown in Fig. 1.

The manner of providing an oscillatory connection between the substantially cup-shaped piston 14 and the end 29 of the connecting rod 16 is substantially that shown in my co-pending application Serial No. 416,824, filed December 27, 1929, to which reference may be had for a complete description thereof.

The reservoir 11 is in the form of a cup having an end wall 30 deepened toward its longitudinal middle and lateral walls 31, of substantially preferably cylindrical form. A cap 32 is provided with a preferably dome shaped end wall and a rim flange 33 suitably formed to engage an outwardly extending bead 34 of the cup walls 31 near the cup rim so as to make a screw-threaded engagement between the flange 33 and the bead 34. A follower comprising a pair of sheet metal disks 35, a cup leather packing 36 and an axially bored hub 37, securing the disks 35 together by their centrally apertured portions, is preferably provided to ensure that air may not be drawn through the body of grease of the cup 11 and from thence through the barrel 10 to the cylinder 17. The packing elements 22 are likewise provided to prevent air being drawn through the tubular barrel into the cylinder 29 from said cylinder. The tubular barrel 10 is projected through a pair of oppositely aligned apertures 38 of the side walls 31 of the lubricant reservoir.

To facilitate sealing the joint between the perforated cup walls and the contiguous portions of the outer surface of the barrel 10, annular inwardly extending flanges 39 are provided from the material of the walls 31. These flanges may be directly soldered to the walls 31 to make a leak proof connection therewith.

The dotted lines in Fig. 1 indicate the facility with which lubricant reservoirs of various sizes, as desired may be applied to the gun barrel.

The end wall 30 of the cup 11 is provided with a pair of converging wall portions which embrace the tubular barrel 10 inserted through the apertures 38, described. The element 12 is axially bored to provide a tubular guide 40 for the piston 14, a piston cylinder 17 and a lubricant dispensing passage at the end of the element 12, wherein the combination valve chamber and nozzle element 41 is supported. The element 41 is like that shown in the embodiment of my invention of Fig. 3, and will be more specifically described in connection therewith. Generally, however, it will be understood that the valve 42 is spring-pressed to its seat by a spring 43 in the valve chamber and that the tubular element 44 integrally projects anteriorly within the protecting tubular end 45 of the element 12 to make a leak proof connection with a lubricating nipple, such as that shown in Figs. 3, 4 and 5 and previously described in connection with Fig. 3.

The gun of Figs. 1 and 2 operates as follows: Upon the nozzle 44 being connected, by contact, with a suitable lubricant receiving nipple, such as that described in connection with Fig. 3, the operator exerting a forward pressure on the suitably widened and curved handle arm 19 with the finger of his hand, embracing the other arm 19' of the handle, the piston rod 15 will be thrust forwardly to project the piston 14 past the lateral apertures 46 of the tubular guide 40, and lubricant previously received in the cylindrical chamber 17 will be trapped therein by movement of the piston over the openings 46, and will be compressed therein and upon a given necessary degree of compression will force the lubricant past the then unseated valve ball 42 through the bore of the nozzle 44 into the nipple.

After supplying the predetermined amount of lubricant from the cylinder bore 17 toward the nipple, the pressure on the handle arm 19 is relieved and the spring 24 will relatively retract the piston rod 15 and the barrel 10 to retract the piston 14 from the cylinder 17 and to uncover the inlet ports 46 for the cylinder.

The preceding reseating of the valve ball 42 and retraction of the piston will reduce the fluid pressure in the chamber 17 to considerably less than atmospheric pressure, whereupon the pressure of atmosphere acting upon the exterior surface of the follower 35—36 will force it against the body of lubricant engaged by its inner surface to force some of the lubricant in amount sufficient to replace the ejected lubricant through the aperture 49 of the tubular barrel 10 disposed within the walls 31 of the cup 11 and anteriorly of the spring 25. This operation is repeated upon each relative reciprocatory movement of the piston rod 15 and gun barrel 10. The follower will be successively moved step by step toward engagement with the portion of the tubular barrel 10 disposed within the cup 11 being guided by the rod 50 disposed axially of the cup walls 31 and supported centrally on the cap 32. The follower hub 37 furnishes a convenient handle for the follower to remove it from the cup when it is desired to refill the cup with lubricant.

The element 12, it will be noted, is of integral construction and when the lubricant in the cylinder 17 is under compression, there is no opportunity for lubricant to leak along joints of the tubular element 12, since such joints as are required, such as the screwthreaded connection 51 is disposed on the approach side of the cylinder 17 rather than on the discharge side. The tubular element 41 is substantially integral with the element 12, being forced in the bore thereof making a press fit with the walls of such bore.

Referring now to the embodiment of my invention shown in Fig. 3, this embodiment differs only from that of Figs. 1 and 2 in that the piston 14' of Fig. 3 and the received end of the connecting rod 16' are of somewhat different construction than the piston 14 and connecting rod 16 of Fig. 1.

Also, I have illustrated in connection with Fig. 3 a construction wherein the apertures 38' of the reservoir tubular walls 31 do not have the inwardly extending flange 39, as in Fig. 1, the walls 31 being shown as soldered by their portions bordering the aperture directly to the exterior tubular walls of the barrel 10.

In this connection also, notice may be had of Fig. 5 wherein the inwardly extending flange 39 substantially as in Fig. 1 is employed to make this leak proof soldered connection, the solder being shown at $x$ therein; also, to Fig. 4, wherein instead of the inwardly extending flange 39, a tubular flange 39' extends outwardly from the reservoir walls 31 and the soldering in such case may, if desired, be applied interiorly of the cup walls 31, as shown at $x$.

The piston and connecting rod construction in each of Figs. 3 and 4 and 5, are substantially similar. In each figure the piston is in the form of a deep cup 14' having relatively thin tubular lateral walls 52 and a substantially conical thickened end wall 53 near, but slightly spaced from the end wall 53. The lateral walls 52 are inwardly crimped as shown at 54 to provide an inwardly extending bead on the inner surface of the piston.

This inward crimping is only performed, however, after the generally knob-shaped end 55 of the connecting rod 16' is inserted into the piston cavity with its reduced neck portion 56 disposed immediately within the portion of the piston walls 52, which are to be crimped as at 54.

The crimping is preferably accomplished first by turning a shallow groove on the outer surface of the piston and then rolling the grooved wall of the piston inwardly.

To thrust the piston forward, the end of the connecting knob 55 engages the inner surface of the tapered end wall 53 of the piston in a manner similar to that shown in Fig. 1. The crimping operation being performed, the knob 55 cannot be withdrawn and upon a retractive movement of the connecting rod 16' will engage the inwardly extending bead provided by the crimping to retract the piston 14'. The outer lateral surfaces of the connecting rod 16' and including that of the knob 55 is of such a reduced diameter relative to the inside diameter of the bored piston 14' as to fit loosely therein, there being preferably some clearance also between the reduced neck 56 and the inner surface of the bead provided by the crimping 54.

This arrangement provides a connection between the connecting rod and the piston, whereby the piston may oscillate slightly on the rod to properly align the piston with the longitudinally extending inner walls.

The elements corresponding to the described combination piston guide, piston cylinder and nozzle support 12 of Fig. 1, for Figs. 3, 4 and 5, are of different constructions. That shown in Fig. 3 only being like that shown in Fig. 1. In Figs. 4 and 5, the tubular guide 40 is dispensed with and a short flaring piston receiving passage 60 and 60' for Figs. 4 and 5 substituted. With this exception, the element 59 of Fig. 4 generally corresponds to the element 12 of Figs. 1 and 3.

In each case, the nozzle of Figs. 1, 3 and 4 is provided by a thin-walled tubular projection 44 of a tubular valve support 41, having relatively thicker walls with an intermediately disposed inwardly extending flange 63 supporting an end of the helical valve spring 43 which spring presses the valve ball 42 against the terminal flange 64 surrounding the inlet opening of the element 41. The tubular element 4 is tightly press-fitted within a slightly enlarged portion 65 of the longitudinal bore of the element 12, Fig. 3, or the element 12', Fig. 4.

All of the elements of the different figures corresponding generally to the element 12, Figs. 1 and 3, 12', Fig. 4, and 12'', Fig. 5, are screwthreaded by their shanks 13, 13', and 13'', respectively, as shown in the different figures. The thin-wall tubular nozzle element 44 of Figs. 1 to 4 inclusive is protected from injury by the tip end 66 of the supporting elements 12, Figs. 1 and 3 and 12', Fig. 4, which closely surrounds the nozzle tube 44 though substantially spaced from contact therewith. The extreme annular end of the protecting element 66 is preferably transversely rounded on a small radius, and thereby recedent from the open end of the nozzle tube.

A good lubricant sealing contact is had between the nozzle tube 44, Figs. 1 to 4, inclusive, and the outer parti-spherical surface of the nipple knob 4, even though the tubular nozzle 44 be disposed in any of a large number of different angularly disposed positions relative to the axis of the nipple, so long as the diameters of the inner surface of the tube 44 adjacent its end is sufficiently less than the diameter of spherical curvature of the engaged portions of the outer surface of the knob, as shown. The inside diameter of the end portion of the tube 44 must be sufficiently great, however, as to establish such a degree of angularity of contact between the lateral surfaces of the nipple and the engaged inner surfaces of the nozzle that a considerable element of wedging occurs.

The lubricant coupler herein provided, as above described, by the interengaging portions of the nozzle 44 and the nipple knob 4 effect a substantially extreme wedging angle between the rounded end surfaces of the tubular nozzle, interiorly thereof, and the nozzle tip surfaces projected thereagainst. Such an extreme wedging engagement is of great advantage in a nozzle such as that described, having thin, resilient spring steel walls, or walls of like material since the greater the wedging angle, the greater the lateral thrust effort upon the walls, to effect a circumferential stretching action thereupon to make them conform to the form of the contact surface of the nipple. The engaged nipple contact surface, under certain conditions of angularity where a nipple not having a perfectly spherical surface is employed, may take an elliptical shape, or become egg-shaped, for instance, when the inside diameter of the thin-walled nozzle tube is made only .004 of an inch smaller than the outside diameter of the spherical nipple, when made of $\frac{7}{32}$ inches, outside diameter, about ten times the lateral force is exerted to tend to stretch the engaged annular portion of the nozzle tube, than is represented by the actual mechanical force exerted by the nozzle on the nipple in a longitudinal direction.

In this manner an enormous effort results to effect such a deformation of the nozzle tube as will make a perfect leak-proof contact between the nozzle and the nipple surfaces.

The tubular nozzle 44 has its end surface transversely rounded in all radial directions, whereby contact may be had with the nipple at a substantially extreme wedging angle, and at the same time scraping of the softer material of the nipple surface is avoided by the provision of the rounded nozzle surface which actually effects a burnishing action on the nipple surface to polish it and in addition keeps the nipple surface in true spherical or other annular form, and removes irregularities in the surface which occur through faulty manufacturing methods, or injuries to the surface effected by the stones or the like striking the nipple.

The walls of the tubular nozzle 44 are thin and are preferably made of resilient hard material and wedging pressure engagement between the forward end of such walls and the nipple nozzle effects a slight circumferential stretching of the tubular nozzle walls within the elastic limit of the material thereof. Contact is made by the spherical nipple surface with a substantial area of the inner portion of the nozzle surface as distinguished from a line-like contact present in prior constructions, which I have found to be practically impossible to maintain in practice without injury and subsequent ineffective operation.

Referring particularly to the embodiment of my invention shown in Fig. 5, the element 12' is similar to that previously described, except that the nozzle tube shown at 68 is integrally formed with the support 12", being a cylindrical thin-walled integral projection of the lateral walls of the tubular element 12", the forward portion of whose outer walls 67 converges from the enlarged portion 69, which is disposed intermediate the shank 13", and the tubular tip or nozzle 68.

The thin-wall tubular nozzle 68 is preferably hardened according to the well known cyanide process or otherwise and operates in a manner like that described for the tubular element 44. No guard, such as that shown at 66, is illustrated for the embodiment of Fig. 5. The valve support of Fig. 5 is in the form of a tube 70, having inturned terminal flanges 71 and 72 at its two ends to retain the valve ball 73 and helical valve spring 74 in position with the valve pressed by the spring to its seat in engagement with the flange 71. The valve support 70 is made of such a size as to be adapted to be tightly press-fitted in the bore 75 of the support 12".

The piston 14' may be like that of Figs. 3 and 4, as before related, or may be of any other suitable form, and enters the bore of the element 12" first through the outwardly flared inlet portion 60', and then makes close fitting engagement with the portion of the bore intermediate the flared inlet 60' and the tubular valve support 70, which forms a piston cylinder chamber equivalent, and for the same purpose, as that shown at 17 for Figs. 1 and 2, and at 58 in Fig. 4.

In the embodiment of Figs. 4 and 5, lubricant is received from the reservoir 11' and 11, respectively, through the gun barrel inlet opening 49 and enters the compression cylinder through the flared inlet 60 and 60', respectively, upon each retractive movement of the piston.

Having thus described my invention in certain embodiments, I am aware that numerous and extensive departures may be made from the said embodiments, but without departing from the spirit of my invention.

I claim:

1. In a lubricant gun, a compressor therefor comprising a piston in the form of a deep cup having substantially cylindrical lateral walls and a tubular cylinder element within which said piston is adapted to be reciprocated, and a thrust rod to reciprocate said piston projecting into its recess, said rod being annularly grooved near its end, and means projecting from the walls of the piston recess nearest the piston end wall received within said annular recess.

2. In a lubricant gun, a tubular barrel, a dispensing nozzle of the contact type and a thrust handle at the opposite ends of the barrel, relatively reciprocable piston and cylinder elements and a retractive spring therefor, in said barrel, said piston having an interior recess extending from an end face beyond its longitudinal middle, piston and cylinder operating means comprising a piston rod, said rod terminating in a knob seated against the end wall of said recess, said rod being annularly grooved, securing means therefor projecting from a wall of the recess, inwardly into said groove, the lateral walls of said recess and rod being substantially relatively relieved in portions spaced from its ball shaped end, to permit oscillation of the piston on the rod knob end.

3. In a lubricant gun, a compressor cylinder, a deeply recessed piston reciprocable therein, a piston rod for the piston terminating in a knob disposed within the piston recess and making a universal thrust contact joint with its end wall beyond the longitudinal middle of the piston, the lateral walls of the piston and of the rod being interlocked by a projection of the one extending loosely within a recess of the other, said projection and recess being disposed intermediate the longitudinal middle of the piston and the end wall of the piston recess.

4. In a lubricant gun, a compressor cylinder, a deeply recessed piston reciprocable therein, a piston rod for the piston terminating in a knob disposed within the piston recess and making a universal thrust contact joint with its end wall beyond the longitudinal middle of the piston, the lateral walls of the piston and of the rod being interlocked by an annular projection of the one extending loosely within an annular recess of the other, said projection and recess being disposed intermediate the longitudinal middle of the piston and the end wall of the piston recess.

5. In a lubricant gun, a tubular barrel, a tubular dispensing element screwthreaded thereto and comprising successive integral piston guide, compression chamber, and nozzle elements, a short tube press-fitted in the dispensing element intermediate said nozzle and compression chamber portions, having a pair of inwardly extending flanges forming a valve seat and a spring supporting element, respectively, and a valve and valve spring in compressed relation between said flanges.

6. In a lubricant gun, an elongated tubular barrel, a combination contact type nozzle, compression chamber and piston guide tubular element joined to an end of the barrel, and projecting by its nozzle portion forwardly therefrom, its guide portion reentrantly projecting within the barrel, said element impervious to leakage of lubricant compressed in its compression chamber, between said chamber and the nipple contacting tip of its nozzle portion, a short tube press-fitted in the dispensing element intermediate said nozzle and compression chamber portions, having a pair of inwardly extending flanges forming a valve seat and a spring supporting element, respectively, and a valve and valve spring in compressed relation between said flanges, the nozzle end of said tube being of reduced thickness whereby to form a resilient lubricant nipple engaging member.

7. A lubricant dispensing element for a lubricant gun comprising a tube having integral lateral walls provided with screwthreads for securing the dispensing element to a lubricant gun barrel end, said walls being substantially reduced in thickness at the tip of the nozzle to provide a tubular thin-walled substantially resilient lubricant nipple engaging nozzle of the contact type, adapted to make wedging resilient contact with convexly inclined walls thereof, and valve means intermediate said nozzle and compression chamber portions.

8. A lubricant dispensing attachment for lubricating guns comprising a principal tubular member having lateral walls of reduced thickness at an end thereof and a longitudinal bore having a widened portion at said reduced end and a second tubular member secured within said bore and having lateral walls of reduced thickness in its region adjacent said widened bore whereby to provide space between said tubular members respectively in the region of said reduced end, said second member having a reduced opening at one end and an interior flange intermediate said end and the opposite end, and ball and spring valve means interposed between said flange and said reduced end, and means in said principal member for securing it to a lubricating gun.

9. A tubular dispensing element for a lubricant gun barrel, having walls initially thick at one of its ends and progressively reduced in thickness toward its other end, said other end having a widened bore, and a tubular, lubrication nipple engaging member secured in said element near its reduced end and comprising a tube having a reduced opening at one end, an interior flange intermediate both ends and walls of reduced thickness in the end thereof opposite said reduced opening and adjacent the widened bore at the nozzle end of said element, said walls of reduced thickness in said member being spaced apart from the interior walls adjacent said widened bore.

10. A lubricant dispensing element for a lubricant gun comprising a principal tube having a longitudinal bore widened at the nozzle end thereof and integral lateral walls provided with screw threads for securing the dispensing element to the end of a lubricant gun barrel, said walls being substantially reduced in thickness at the nozzle end of said tube, and a lubricant nipple engaging member comprising a second tube having a reduced opening at one end, an interior flange intermediate its extremities, the other end of said second tube being substantially reduced in thickness to provide a tubular, thin-walled, substantially resilient, lubricant-nipple engaging nozzle of the contact type adapted to make wedging resilient contact with the lubrication nipple, said member being secured in said principal tube and its reduced, thin-walled end being spaced apart from the nozzle end of said principal tube at the widened region of said bore, said member having ball and spring valve means between the reduced end thereof and said interior flange therein.

OSCAR U. ZERK.